US012634489B2

(12) United States Patent
Ilangovan et al.

(10) Patent No.: US 12,634,489 B2
(45) Date of Patent: May 19, 2026

(54) FASTER HYBRID THREE PASS ENCODING FOR VIDEO STREAMING

(71) Applicant: Bitmovin GmbH, Klagenfurt am Wörthersee (AT)

(72) Inventors: Adithyan Ilangovan, Klagenfurt am Wörthersee (AT); Radu Ruse, Berlin (DE); Martin Smole, Klagenfurt am Wörthersee (AT); Armin Trattnig, Klagenfurt am Wörthersee (AT)

(73) Assignee: Bitmovin GmbH, Klagenfurt am Wörthersee (AT)

( * ) Notice: Subject to any disclaimer, the term of this patent is extended or adjusted under 35 U.S.C. 154(b) by 370 days.

(21) Appl. No.: 18/101,968

(22) Filed: Jan. 26, 2023

(65) Prior Publication Data

US 2024/0259574 A1      Aug. 1, 2024

(51) Int. Cl.
  *H04N 19/192*        (2014.01)
  *G06V 20/40*          (2022.01)
  *H04N 19/14*          (2014.01)
(52) U.S. Cl.
  CPC ........... *H04N 19/192* (2014.11); *G06V 20/49* (2022.01); *H04N 19/14* (2014.11)
(58) Field of Classification Search
  CPC ....... H04N 19/192; H04N 19/14; H04N 19/49
  See application file for complete search history.

(56) References Cited

U.S. PATENT DOCUMENTS

| 10,104,413 | B2 | 10/2018 | Phillips et al. |
| 10,419,773 | B1 | 9/2019 | Wei et al. |
| 10,499,081 | B1 | 12/2019 | Wang et al. |
| 10,798,399 | B1 | 10/2020 | Wei et al. |
| 10,958,947 | B1 | 3/2021 | Wei et al. |
| 11,445,168 | B1 | 9/2022 | Wei et al. |
| 2005/0018881 | A1 | 1/2005 | Peker et al. |
| 2010/0189183 | A1 | 7/2010 | Gu et al. |
| 2011/0305273 | A1 | 12/2011 | He et al. |
| 2012/0147958 | A1 | 6/2012 | Ronca |
| 2013/0089142 | A1 | 4/2013 | Begen et al. |

(Continued)

OTHER PUBLICATIONS

Bentaleb et al., "A Survey on Bitrate Adaptation Schemes for Streaming Media Over HTTP,", IEEE Communications Surveys & Tutorials, vol. 21, No. 1, 2019, pp. 562-585.

(Continued)

*Primary Examiner* — On S Mung
(74) *Attorney, Agent, or Firm* — Marton Ribera Schumann & Chang LLP; Chien-Ju Alice Chuang

(57)                    ABSTRACT

The technology described herein relates to hybrid three pass encoding for video streaming. A method for hybrid three pass encoding may include performing a first pass encoding of a video input using a lower complexity encoder, splitting the video input into segments, performing a two pass encoding of each of the segments using a higher complexity encoder and the complexity curve generated in the first pass encoding, and outputting an encoded version of the video input. The first pass using a lower complexity encoder significantly reduces the encoding time and end-to-end encoding complexity. In some embodiments, the first pass may be performed on one of many renditions of the video input, the resulting complexity curve being used for subsequent two pass encodings of many or all renditions of the video input.

19 Claims, 7 Drawing Sheets

100

(56) References Cited

U.S. PATENT DOCUMENTS

| | | | |
|---|---|---|---|
| 2013/0282917 | A1 | 10/2013 | Reznik et al. |
| 2016/0073106 | A1 | 3/2016 | Su |
| 2016/0134881 | A1 | 5/2016 | Wang |
| 2017/0078574 | A1* | 3/2017 | Puntambekar ..... H04N 23/6811 |
| 2017/0078686 | A1 | 3/2017 | Coward et al. |
| 2018/0014050 | A1 | 1/2018 | Phillips et al. |
| 2018/0338146 | A1 | 11/2018 | John |
| 2019/0028745 | A1 | 1/2019 | Katsavounidis |
| 2019/0075301 | A1 | 3/2019 | Chou et al. |
| 2019/0132591 | A1 | 5/2019 | Zhang et al. |
| 2019/0289296 | A1 | 9/2019 | Kottke et al. |
| 2020/0412784 | A1 | 12/2020 | Yamagishi et al. |
| 2023/0012862 | A1 | 1/2023 | Kossentini et al. |

OTHER PUBLICATIONS

Jain et al., "Throughput Fairness Index: An Explaination", 1984, p. - 13.
Mehrabi et al., "Edge Computing Assisted Adaptive Mobile Video Streaming", IEE Transactions on Mobile Computing, vol. 18, No. 4, Apr. 2019, pp. 787-800.
Lederer et al., "Dynamic Adaptive Streaming over HTTP Dataset", Proceedings of the 3rd Multimedia Systems Conference, Feb. 2012, pp. 89-94.
Ericsson, "Ericsson Mobility Report", Nov. 2019, pp. 1-36.
ETSI, "Mobile Edge Computing A Key Technology Towards 5G", ETSI White Paper No. 11, Sep. 2015, pp. 1-16.
Nguyen et al., "Adaptation Method for Video Streaming over HTTP/2", IEICE Communications Express Comex, vol. 1, pp. 1-6, https://www.researchgate.netpublication/292213198_Adaptation_Method_for_Video_Streaming_over_HTTP2).
3GPP "3GPP TS 26.247. Progressive Download and Dynamic Adaptive Streaming over HTTP (3GP-DASH)", 2015, pp. 1, https://portal.3gpp.org/desktopmodules/Specifications/SpecificationDetails.aspx?specificationId=1444.
Gernot Zwantschko, "What is Per-Title Encoding? How to Efficiently Compress Video", Bitmovin, pp. 1-14, https://bitmovin.com/per-title-encoding/.
V.V Menon et al., "Efficient Content-Adaptive Feature-Based Shot Detection for HTTP Adaptive Streaming" IEEE, May 20, 2021, pp. 1-2, https://www.youtube.com/watch?v=jkA1R0shpTc.
Liu et al., "Video Super-Resolution Based on Deep Learning: A Comprehensive Survey", arXiv:2007.12928v3 [cs.CV], Mar. 16, 2022, pp. 1-33.
Jon Dahl, "Instant Per-Title Encoding", MUX, Apr. 17, 2018, pp. 1-8, https://mux.com/blog/instant-per-title-encoding/.
Ledig et al., "Photo-Realistic Single Image Super-Resolution Using a Generative Adversarial Network", arXiv:1609.04802, May 25, 2017, pp. 1-19, http:/arxiv.org/abs/1609.04802.
Mishra et al., "A Survey on Deep Neural Network Compression: Challenges, Overview, and Solutions", arXiv:2010.03954, Oct. 5, 2020, pp. 1-19, https://arxiv.org/abs/2010.03954.
Li et al., "Toward A Practical Perceptual Video Quality Metric", Netflix Technology Blog, Jun. 5, 2016, pp. 1-23, https://netflixtechblog.com/toward-a-practical-perceptual-video-quality-metric-653f208b9652.
Menon et al., "ETPS: Efficient Two-pass Encoding Scheme for Adaptive Live Streaming," Athena, https://www.youtube.com/watch?v=-pb3VJtrBN4, Oct. 16-19, 2022, pp. 1-2.

* cited by examiner

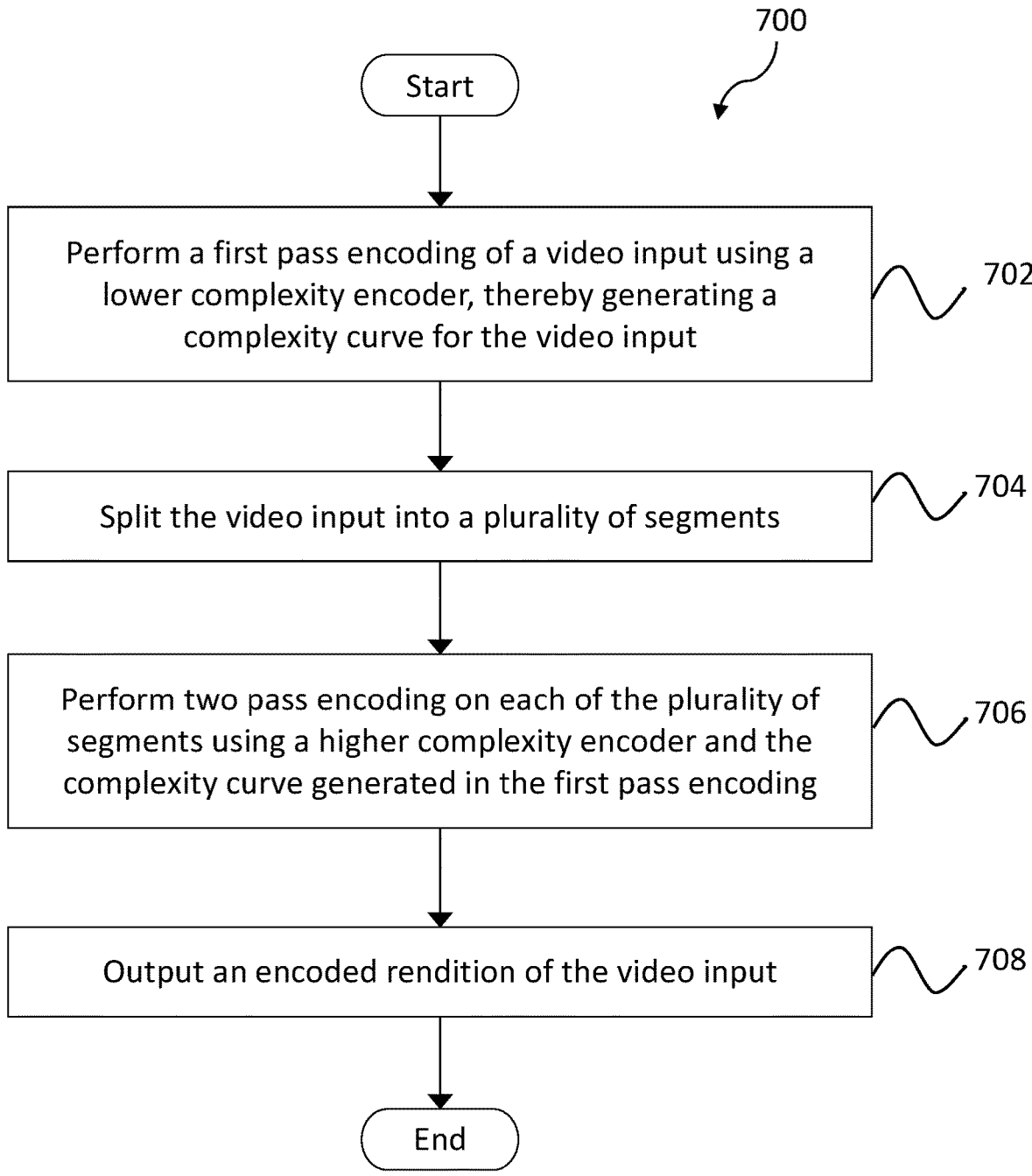

700

Start

Perform a first pass encoding of a video input using a lower complexity encoder, thereby generating a complexity curve for the video input    702

Split the video input into a plurality of segments    704

Perform two pass encoding on each of the plurality of segments using a higher complexity encoder and the complexity curve generated in the first pass encoding    706

Output an encoded rendition of the video input    708

End

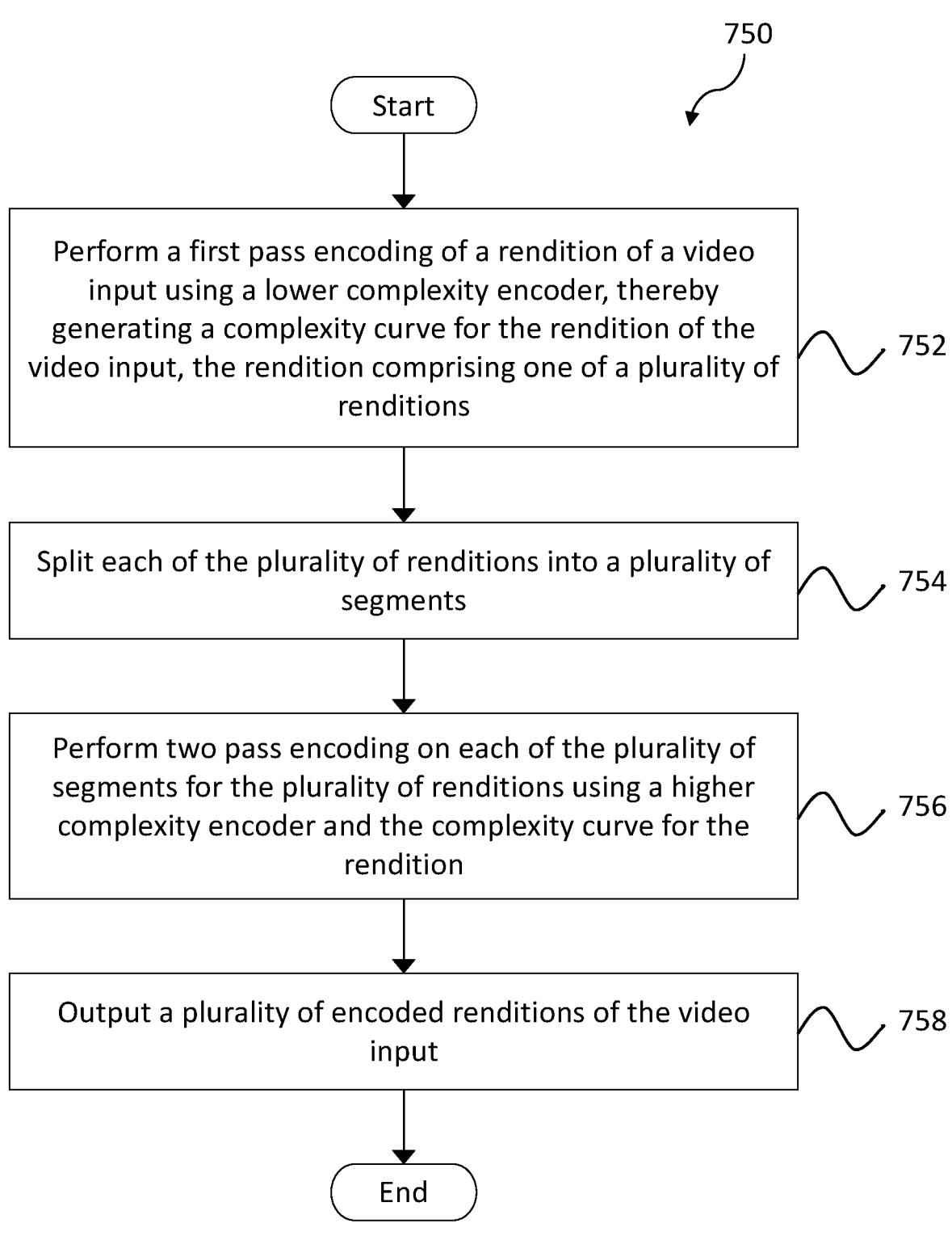

Start

Perform a first pass encoding of a rendition of a video input using a lower complexity encoder, thereby generating a complexity curve for the rendition of the video input, the rendition comprising one of a plurality of renditions

752

Split each of the plurality of renditions into a plurality of segments

754

Perform two pass encoding on each of the plurality of segments for the plurality of renditions using a higher complexity encoder and the complexity curve for the rendition

756

Output a plurality of encoded renditions of the video input

758

End

FASTER HYBRID THREE PASS ENCODING FOR VIDEO STREAMING

BACKGROUND OF INVENTION

This disclosure generally relates to encoding of video or other media, and more particularly to the encoding of video titles using a multi-pass approach.

Due to the increasing availability of mobile high-speed Internet connections like WLAN/3G/4G/5G and the smartphone and tablet device boom, mobile video streaming has become an important aspect of modern life. Online video portals like YouTube or Netflix deploy progressive download or adaptive video on demand systems and count millions of users watching their content every day. The volume of real-time entertainment continues to increase as the distribution of content world-wide moves more toward streaming platforms and stream size increases with additional audio-visual quality features and with higher resolutions, transitioning from 1080p to 4K, 8K, and future developed resolution standards. Moreover, particularly for mobile environments, adaptive streaming is required to cope with the considerable high fluctuations in available bandwidth. The video stream has to adapt to the varying bandwidth capabilities in order to deliver the user a continuous video stream without stalls at the best possible quality for the moment, which is achieved, for example, by dynamic adaptive streaming over HTTP.

In this context, adaptive streaming technologies, such as the ISO/IEC MPEG standard Dynamic Adaptive Streaming over HTTP (DASH), Microsoft's Smooth Streaming, Adobe's HTTP Dynamic Streaming, and Apple Inc.'s HTTP Live Streaming, have received a lot of attention in the past few years. These streaming technologies require the generation of content of multiple encoding bitrates and varying quality to enable the dynamic switching between different versions (i.e., representations) of a title with different bandwidth requirements to adapt to changing conditions in the network. Prior encoding processes do not provide a truly optimized encoding for a given video title, but rather encodes using a rough estimation of complexity for an entire video title. A fundamental nature of any given video file is that the complexity (i.e., information to encode) varies across the time dimension. Highly complex frames or segments typically require more bits to encode to attain the same visual quality and vice versa for low complex segments. Multiple pass encoding techniques were developed to address this issue and provide a more optimized encoding for a given video, enabling the computation of per-frame complexity variation of a video and thus improved bitrate allocation. However, in practice, in order to scale (i.e., speed up) encoding, videos are split into segments and encoded independently and in parallel, so information between encodings of separate segments are not shared. Thus, conventional multiple pass encoding still often results in suboptimal bitrate allocation for video encodings.

Another weakness of existing multiple pass encoding techniques includes using the same encoder to compute both a first pass complexity curve of a video and that of renditions (e.g., resolutions and/or bitrates) of the video in subsequent passes. Existing techniques also computes a complexity curve separately for every rendition of a given video. Both of these limitations result in a slower process that involves unnecessary computations.

Thus, it is desirable to have an improved faster hybrid three pass encoding for video streaming.

BRIEF SUMMARY

The present disclosure provides for techniques relating to a faster hybrid three pass encoding technique for video streaming. A method for hybrid three pass encoding may include: performing a first pass encoding of a rendition of a video input using a lower complexity encoder, thereby generating a complexity curve for the video input; splitting the rendition of the video input into a plurality of segments; performing a two pass encoding of each of the plurality of segments using a higher complexity encoder and the complexity curve generated in the first pass encoding; and outputting an encoded rendition of the video input. In some examples, the complexity curve from the first pass encoding characterizes an overarching shape of a complexity of the video input as a whole. In some examples, the first pass encoding of the video input comprises an H.264 encoding. In some examples, the two pass encoding of each of the plurality of segments comprises an AV1 encoding. In some examples, the first pass encoding comprises a constant rate factor encoding. In some examples, the method also includes performing the first pass encoding on another rendition of the video input, thereby generating another complexity curve, and then combining the complexity curve with the other complexity curve using a mapping function configured to output a combined complexity curve, wherein the two pass encoding is performed using the combined complexity curve. In some examples, a first encoding time for performing the first pass encoding is at least 25% less than a second encoding time for performing the two pass encoding. In some examples, a first encoding time for performing the first pass encoding is at least 40% less than a second encoding time for performing the two pass encoding. In some examples, a first encoding time for performing the first pass encoding is at least 50% less than a second encoding time for performing the two pass encoding.

A system for hybrid three pass encoding may include: a memory comprising non-transitory computer-readable storage medium configured to store video data; one or more processors configured to execute instructions stored on the non-transitory computer-readable storage medium to: perform a first pass encoding of a video input using a lower complexity encoder, thereby generating a complexity curve for the video input; split the video input into a plurality of segments; perform a two pass encoding of each of the plurality of segments using a higher complexity encoder and the complexity curve generated in the first pass encoding; and output an encoded rendition of the video input. In some examples, the lower complexity encoder comprises an H.264 encoder. In some examples, the higher complexity encoder comprises an AV1 encoder.

A method for hybrid three pass encoding may include: performing a first pass encoding of a rendition of a video input using a lower complexity encoder, thereby generating a complexity curve for the rendition of the video input, the rendition comprising one of a plurality of renditions; splitting each of the plurality of renditions into a plurality of segments; performing two pass encoding on each of the plurality of segments for the plurality of renditions using a higher complexity encoder and the complexity curve for the rendition; and outputting a plurality of encoded renditions of the video input. In some examples, the complexity curve from the first pass encoding characterizes an overarching shape of a complexity of the video input as a whole. In some examples, the first pass encoding of the video input com-
prises an H.264 encoding. In some examples, the two pass
encoding of each of the plurality of segments comprises an
AV1 encoding. In some examples, the first pass encoding
comprises a constant rate factor encoding. In some
examples, a first encoding time for performing the first pass
encoding is at least 40% less than a second encoding time for
performing the two pass encoding.

A system for hybrid three pass encoding may include: a
memory comprising non-transitory computer-readable stor-
age medium configured to store video data; one or more
processors configured to execute instructions stored on the
non-transitory computer-readable storage medium to: per-
form a first pass encoding of a rendition of a video input
using a lower complexity encoder, thereby generating a
complexity curve for the rendition of the video input, the
rendition comprising one of a plurality of renditions; split
each of the plurality of renditions into a plurality of seg-
ments; perform two pass encoding on each of the plurality
of segments for the plurality of renditions using a higher
complexity encoder and the complexity curve for the ren-
dition; and output a plurality of encoded renditions of the
video input.

BRIEF DESCRIPTION OF THE DRAWINGS

FIGS. 7A-7B are flow diagrams illustrating exemplary
methods for hybrid three pass encoding for video streaming,
in accordance with one or more embodiments.

Figure 1:
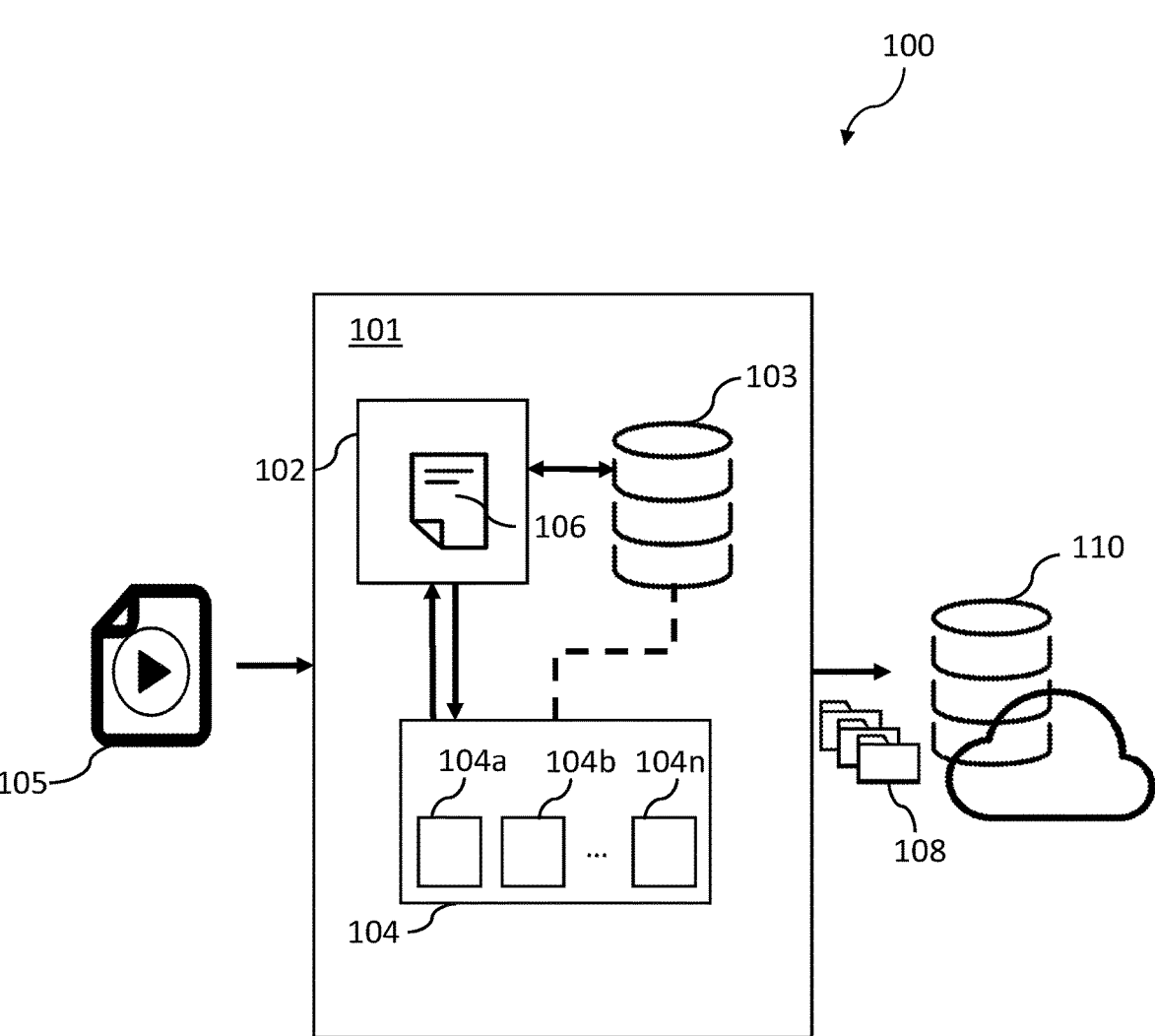
FIG. 1 is an illustrative diagram of an exemplary encoding
system for implementing a hybrid three pass encoding for
video streaming, in accordance with one or more embodi-
ments.

The figures depict various example embodiments of the
present disclosure for purposes of illustration only. One of
ordinary skill in the art will readily recognize from the
following discussion that other example embodiments based
on alternative structures and methods may be implemented
without departing from the principles of this disclosure and
which are encompassed within the scope of this disclosure.

DETAILED DESCRIPTION

The Figures and the following description describe certain
embodiments by way of illustration only. One of ordinary skill in the art will readily recognize from the following
description that alternative embodiments of the structures
and methods illustrated herein may be employed without
departing from the principles described herein. Reference
will now be made in detail to several embodiments,
examples of which are illustrated in the accompanying
figures.

Three pass encoding often involves a first pass to find a
shape of a complexity curve for the video input as a whole
(e.g., before the video input is split or divided into segments
or chunks). In this first pass, an overarching complexity
variation (i.e., shape of a complexity curve) of the video
input may be determined using a constant rate factor (CRF)
encoding. Three pass encoding often also involves a second
and third pass, in which each segment (i.e., chunk) of the
video input is encoded with a two pass encoding mode, the
bitrate for these latter passes being determined by the shape
of the complexity curve determined in the first pass. This
process is typically performed for each of a plurality of
renditions (e.g., resolutions, bitrates, resolution-bitrate
pairs) of a video input.

The present invention includes using a lower complexity
encoder for the first pass (e.g., as compared to a relatively
higher complexity encoder for the second and third passes).
The lower complex encoder may be used to perform CRF
encoding and compute the overarching complexity curve for
the video input. In some examples, the complexity curve
may be computed for only one or a few renditions, which
may then be used for a plurality of renditions. In an example,
the lower complexity encoder may perform an H.264 CRF
encode to generate an overarching complexity curve for a
given video input. The subsequent passes may be encoded
using AV1 after the given video input is split into segments.
Reducing the complexity of encoding in the first pass
significantly reduces the complexity of the entire encoding,
particularly when encoding a plurality of renditions.

The overarching complexity curve is dependent on the
video input, and not on the encoder (e.g, codec) being used
or the rendition being encoded, thus the overarching com-
plexity curve often is highly correlated across all renditions.
Therefore, one or a few rendition(s) may be selected by the
encoding system for a first pass encoding, the complexity
curve for that one or those few rendition(s) being used in the
second and third pass encodings of all renditions of a video
input.

Example Encoding System

FIG. 1 is an illustrative diagram of an exemplary encoding
system for implementing a hybrid three pass encoding for
video streaming, in accordance with one or more embodi-
ments. In one embodiment, the encoding system 100 is a
cloud-based encoding system available via computer net-
works, such as the Internet, a virtual private network, or the
like. The encoding system 100 and any of its components
may be hosted by a third party or kept within the premises
of an encoding enterprise, such as a publisher, video stream-
ing service, or the like. The encoding system 100 may be a
distributed system but may also be implemented in a single
server system, multi-core server system, virtual server sys-
tem, multi-blade system, data center, or the like. The encod-
ing system 100 and its components may be implemented in
hardware and software in any desired combination within
the scope of the various embodiments described herein.

According to one embodiment, the encoding system 100
includes an encoder service 101. The encoder service 101
supports various input and output formats (e.g., HTTP, FTP,
AWS-S3, GCS, Aspera, Akamai NetStorage, etc.) and mul-
tiple codecs (e.g., H.264, H.265, VP9, AV1, AAC, etc.) for video streaming (e.g., VOD, live streaming). It also may support streaming protocols like MPEG-DASH and HLS and may be integrated with Digital Rights Managers (DRMs) like Widevine, Playready, Marlin, PrimeTime, Fairplay, and the like. According to embodiments, the encoder service 101 may be a multi-cloud service capable of dynamically scaling with generation of processing nodes to support the workload. In one embodiment, for a particular encoding process, the encoder service 101 can generate an encoder coordinator node 102 supported by a machine learning module 103 and one or more encoder nodes 104.

According to embodiments, encoder nodes 104 can instantiate any number of encoder instances or submodules 104a, 104b, . . . , 104n, each capable of encoding an input video into an encoding format. The encoder node 104 performs the encodings, connecting inputs to outputs, applying codec configurations and filters on the input video files. The encoders can apply different and multiple muxings on streams like MPEG2-TS, fragmented MP4 and progressive MP4 and add DRM to the content and/or encrypted it as needed. Encoder node 104 can also extract and embed captions and subtitles, e.g., 608/708, WebVTT, SRT, etc.

For example, encoding submodule 104a may be an MPEG-DASH encoding submodule for encoding an input video 105 into a set of encoded media 108 (e.g., encoded renditions of input video 105) according to the ISO/IEC MPEG standard for Dynamic Adaptive Streaming over HTTP (DASH). The encoding submodules 104b-104n may provide encoding of video for any number of formats, including without limitation Microsoft's Smooth Streaming, Adobe's HTTP Dynamic Streaming, and Apple Inc.'s HTTP Live Streaming. In addition, encoding submodules 104b-104n may use any type of codec for video encoding, including, for example, H.264/AVC, H.265/HEVC, VP8, VP9, AV1, and others. Any encoding standard or protocol may be supported by the encoder node 104 by providing a suitable encoding submodule with the software and/or hardware required to implement the desired encoding. In addition, in embodiments, encoder node 104 may be distributed in any number of servers in hardware, software, or a combination of the two, networked together and with the encoder coordinator node 102.

According to one aspect of embodiments of the invention, the encoder node 104 encodes an input video 105 at multiple bitrates with varying resolutions into a resulting encoded media 108. For example, in one embodiment, the encoded media 108 includes a set of fragmented MP4 files encoded according to the H.264 video encoding standard and a media presentation description ("MPD") file according to the MPEG-DASH specification. In an alternative embodiment, the encoding node 104 encodes a single input video 105 into multiple sets of encoded media 108 according to multiple encoding formats, such as MPEG-DASH and HLS for example. Input video 105 may include digital video files or streaming content from a video source, such as a camera, or other content generation system. According to embodiments, the encoder node 104 processes a video file in time-based chunks corresponding to portions of the input video file 105. Encoding submodules 104a-n process the video chunks for a given input video file substantially in parallel, providing a faster encoding process than serially processing the video file 105. The encoder node 104 is capable of generating output encoded in any number of formats as supported by its encoding submodules 104a-n.

According to another aspect of various embodiments, the encoder node 104 encodes the input video based on a given encoder configuration 106. The encoder configuration 106 can be received into the encoding server 101, via files, command line parameters provided by a user, via API calls, HTML commands, or the like. According to one embodiment, the encoder configuration 106 may be generated or modified by the encoder coordinator node 102 and/or the machine learning module 103. The encoder configuration 106 includes parameters for controlling the content generation, including the variation of the segment sizes, bitrates, resolutions, encoding settings, URL, etc. For example, according to one embodiment, the input configuration 106 includes a set of target resolutions desired for encoding a particular input video 105. In one embodiment, the target resolutions may be provided as the pixel width desired for each output video and the height is determined automatically by keeping the same aspect ratio as the source. For example, the following pixel-width resolutions may be provided 384, 512, 640, 768, 1024, 1280, 1600, 1920, 2560, 3840. In this embodiment, the encoded output 108 includes one or more sets of corresponding videos encoding in one or more encoding formats for each specified resolution, namely, 384, 512, 640, 768, 1024, 1280, 1600, 1920, 2560, and 3840. In one embodiment, a set of fragmented MP4 files for each resolution is included in the encoded output 108. According to yet another aspect of various embodiments, the encoder configuration 106 is customized for the input video 105 to provide an optimal bitrate for each target resolution.

According to embodiments, the machine learning module 103 learns relationships between characteristics of input video files 105 and corresponding encoder configuration settings 106. In one embodiment, the machine learning module 103, interacts with the coordinator node 102 to determine optimized encoding parameters for the video file 105 based on extracted video parameters and learned relationships between video parameters and encoding parameters through training and learning from prior encoding operations. In embodiments, the machine learning module 103 receives output from quality check functions measuring objective parameters of quality from the output of the encoder instance submodules 104a-n. This output provides feedback from learning the impact of encoder parameters 106 on quality given a set of input video 105 characteristics. According to embodiments, the machine learning module 103 stores the learned relationships between input video characteristics and encoder settings using artificial intelligence, for example, in a neural network.

According to another aspect of various embodiments, the encoded output 108 is then delivered to storage 110. The encoding service 101 can connect to cloud-based storage as an output location to write the output files. The specific location/path may be configured for each specific encoding according to embodiments. For example, in one embodiment, storage 110 includes a content delivery network ("CDN") for making the encoded content 108 available via a network, such as the Internet. The delivery process may include a publication or release procedure, for example, allowing a publisher to check quality of the encoded content 108 before making available to the public. In another embodiment, the encoded output 108 may be delivered to storage 110 and be immediately available for streaming or download, for example, via a website.

Example Methods

Figures 2, 3:
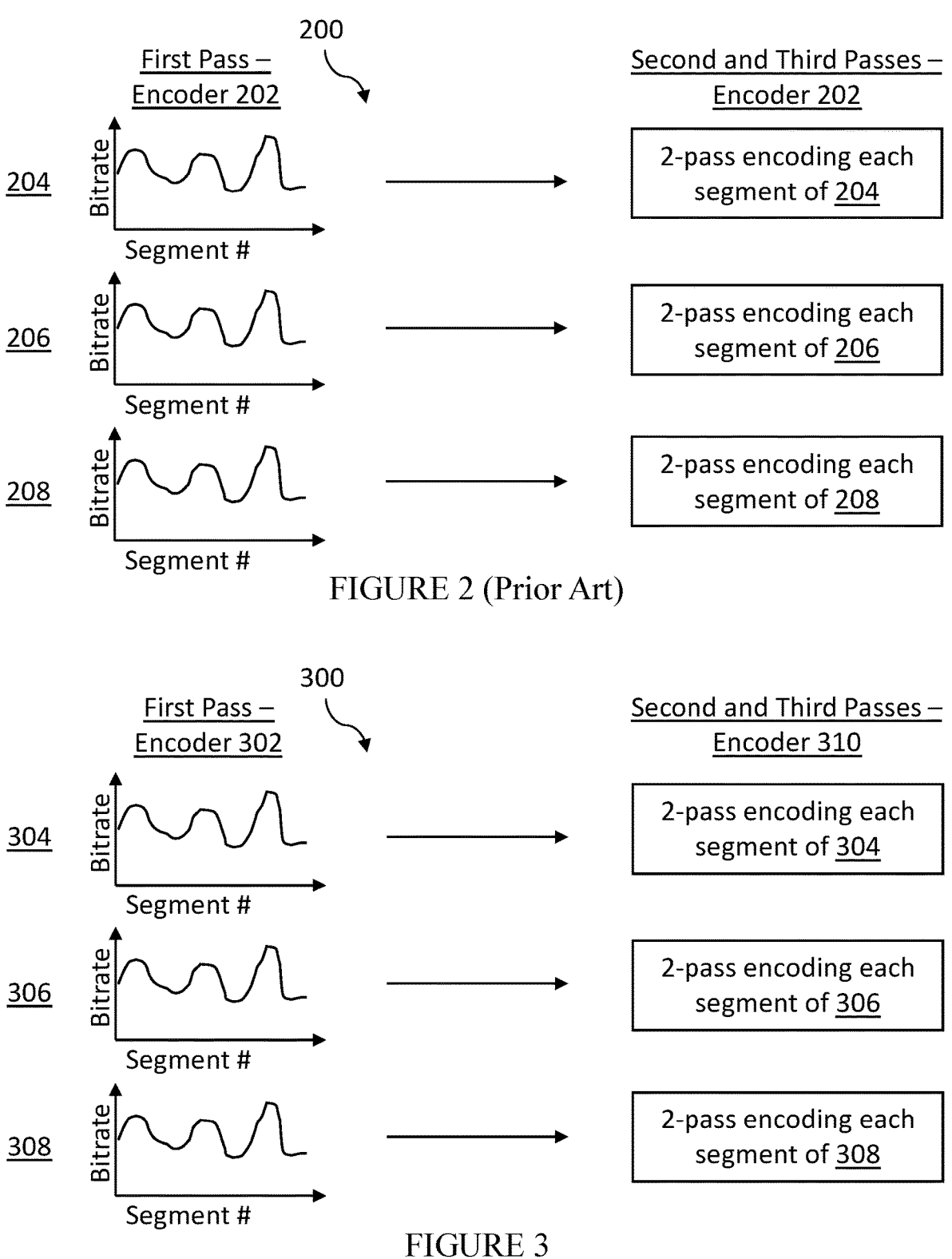
FIG. 2 is a diagram illustrating a prior art method for three
pass encoding for video streaming, in accordance with one
or more embodiments.
FIG. 3 is a diagram illustrating an exemplary method for
hybrid three pass encoding for video streaming, in accor-
dance with one or more embodiments.

FIG. 2 is a diagram illustrating a prior art method for three pass encoding for video streaming, in accordance with one or more embodiments. In diagram 200, a first pass encoding is performed by encoder 202 on renditions 204, 206, and 208 of a video input, thereby generating complexity curves for each of said renditions, as shown. The complexity curve for rendition 204 is then used in the second and third passes wherein each segment of rendition 204 is encoded using the same encoder 202. The same steps are performed with renditions 206 and 208, also using encoder 202 for all of the passes.

FIG. 3 is a diagram illustrating an exemplary method for hybrid three pass encoding for video streaming, in accordance with one or more embodiments. Diagram 300 depicts a first pass encoding of renditions 304, 306, and 308, by encoder 302. In some examples, renditions 304, 306, and 308, may comprise versions of a video input, each version having a different resolution and/or bitrate. For example, rendition 304 may be a rendition of the video input at 360p and 1 Mbps, rendition 306 may be a rendition of the video input at 720p and 3 Mbps, and rendition 308 may be a rendition of the video input at 1080p and 5 Mbps. The complexity curves for renditions 304, 306, and 308, may be used respectively in the second and third pass encodings of the segments in each rendition, respectively, with encoder 310—a different encoder. In some examples encoder 302 may be a lower complexity encoder and encoder 310 may be a higher complexity encoder. In some examples, encoder 302 may be configured to perform a first pass CRF encoding on a video input (e.g., renditions 304, 306, and 308 of a video input) to generate a complexity curve (e.g., for each rendition). The complexity curves for renditions 304, 306, and 308, may be used in their second and third pass encodings, respectively, wherein each segment of each of the renditions may be two pass encoded using encoder 310. In some examples, encoder 310 may be a higher complexity encoder configured to generate and output encoded renditions of video input. In an example, encoder 302 may comprise an H.264 encoder where encoder 310 may comprise an AV1 encoder. In some examples, there may be more renditions than shown, and thus the reduction in complexity in computing complexity curves in the first pass can significantly reduce time and encoding complexity resulting in a faster process that has less end-to-end encoding complexity.

Figures 4, 5:
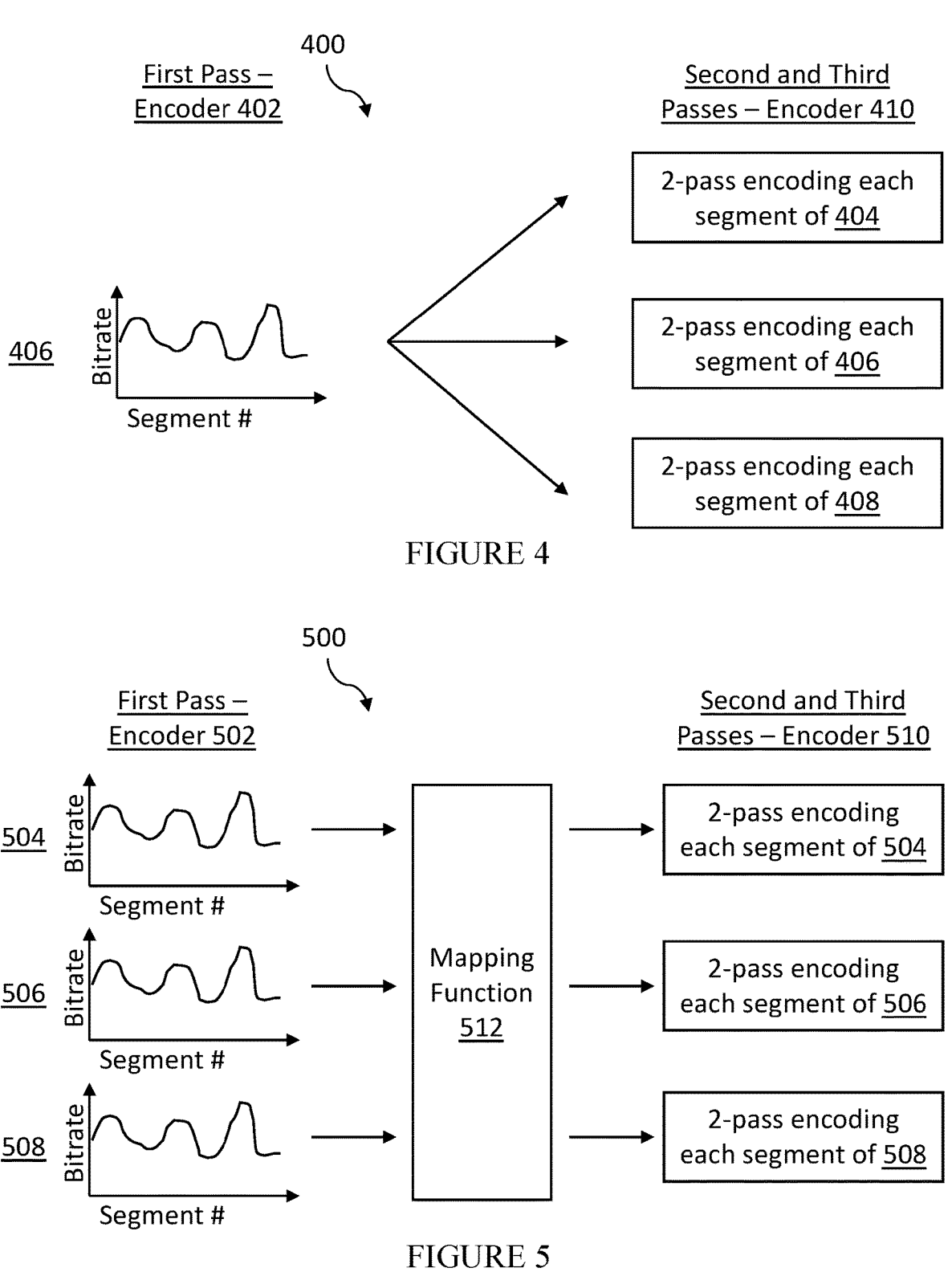
FIG. 4 is a diagram illustrating another exemplary method
for hybrid three pass encoding for video streaming, in
accordance with one or more embodiments.
FIG. 5 is a diagram illustrating yet another exemplary
method for hybrid three pass encoding for video streaming,
in accordance with one or more embodiments.

FIG. 4 is a diagram illustrating another exemplary method for hybrid three pass encoding for video streaming, in accordance with one or more embodiments. Diagram 400 depicts a first pass encoding of a selected rendition 406 by encoder 402. The complexity curve for rendition 406 may be used in the second and third pass encodings of the segments in each of renditions 404, 406, and 408, respectively, by encoder 410-a different encoder. Similar to renditions shown in FIG. 3, renditions 404, 406, and 408, may comprise versions of a video input, each version having a different resolution and/or bitrate (e.g., 360p and 1 Mbps, 720p and 3 Mbps, 1080p and 5 Mbps, and the like). In some examples, encoder 402 may be a lower complexity encoder and encoder 410 may be a higher complexity encoder. In some examples, encoder 402 may be configured to perform a first pass CRF encoding on a video input to generate a complexity curve for a selected rendition (e.g., 406). In some examples, the selected rendition may comprise a highest resolution and highest bitrate rendition. In other examples, the selected rendition may comprise a lowest resolution and lowest bitrate rendition. In still other examples, multiple renditions may be selected in the first pass to obtain multiple shapes that can be combined (e.g., using a suitable machine learning or other intelligent algorithm) to generate one resulting final shape for a subsequent pass. The complexity curve for rendition 406 may be used in the second and third pass encodings for all renditions, including renditions 404, 406, and 408, wherein each segment of each of the renditions may be two pass encoded using encoder 410, a higher complexity encoder configured to generate and output encoded renditions of video input. In an example, encoder 402 may comprise an H.264 encoder where encoder 410 may comprise an AV1 encoder. In another example, encoder 402 may comprise an H.264 encoder where encoder 410 may comprise a VVC encoder. In still another example, encoder 402 may comprise an H.264 encoder where encoder 410 may comprise an HEVC encoder. One of ordinary skill in the art would understand there are a variety of combinations of higher complexity and lower complexity encoders that may be used herein. In some examples, there may be more renditions than shown, and thus the reduction in complexity in computing complexity curves in the first pass can significantly reduce time and encoding complexity resulting in a faster process that has less overall (i.e., end-to-end) encoding complexity.

FIG. 5 is a diagram illustrating yet another exemplary method for hybrid three pass encoding for video streaming, in accordance with one or more embodiments. Diagram 500 depicts a first pass encoding of each of renditions 504, 506, and 508, the resulting complexity curves being combined by mapping function 512 or other intelligent combining algorithm. Similar to renditions shown in FIGS. 3-4, renditions 504, 506, and 508, may comprise versions of a video input, each version having a different resolution and/or bitrate (e.g., 360p-1 Mbps, 720p-3 Mbps, 1080p-5 Mbps, and the like). In some examples, mapping function 512 may be any generic mathematical mapping function. The resulting combined complexity curve(s) may then be used by high complexity encoder 510 to perform second and third pass encodings on segments 504, 506, and 508, respectively.

The benefits (e.g., speed and complexity reduction) may be particularly pronounced wherein the lower complexity encoders (e.g., encoders 302, 403, and 502) and the higher complexity encoders (e.g., encoders 310, 410, and 510) are highly asymmetric. For example, an AV1 encoder is much more computationally intensive than an H.264 encoder. The invention described herein results in visually the same or very similar quality as prior art three pass encoding methods (e.g., little-to-no visual quality degradation).

Figures 6A, 6B, 6C:
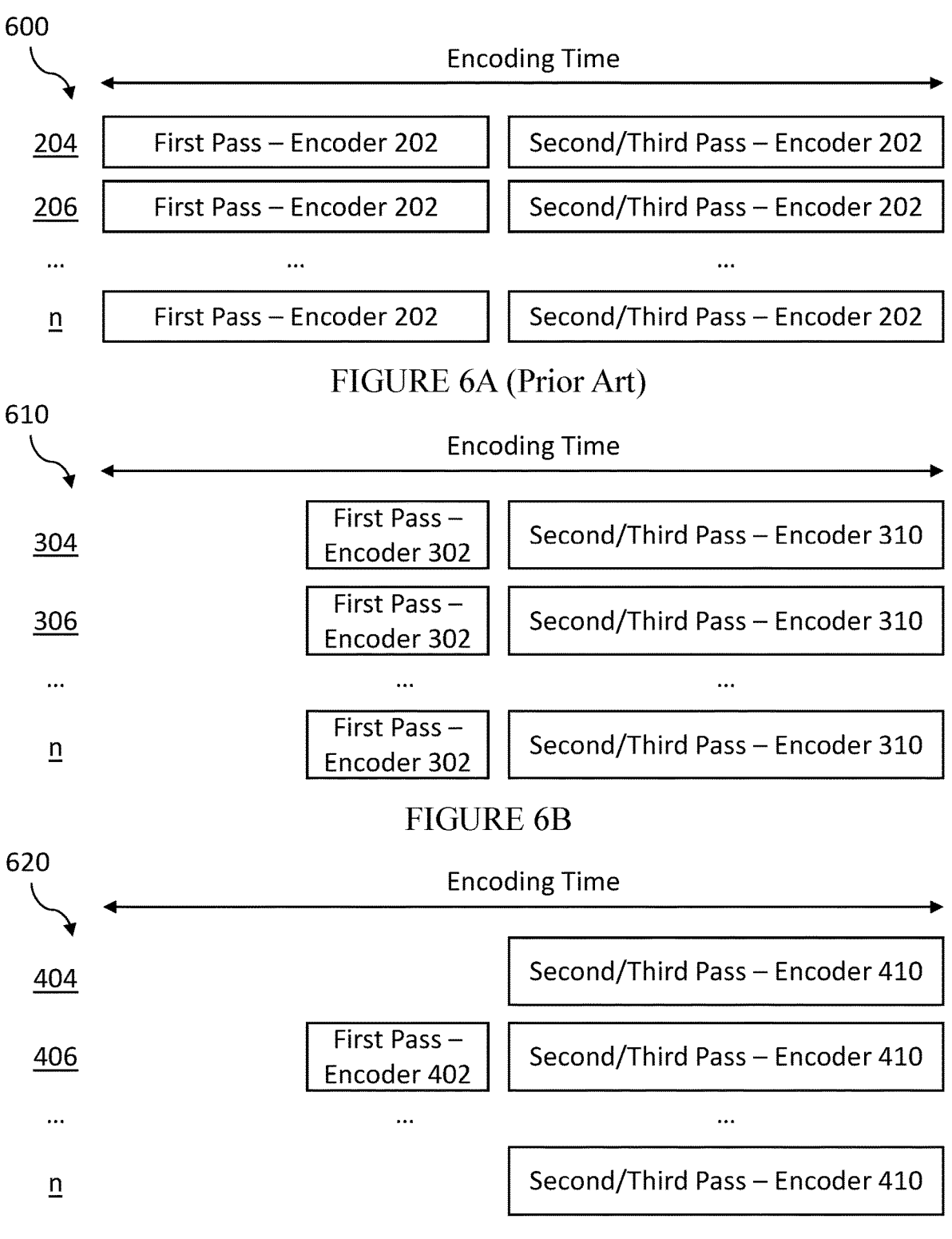
FIGS. 6A-6C are charts showing exemplary relative
encoding times for hybrid three pass encoding for video
streaming as compared to the prior art method for three pass
encoding, in accordance with one or more embodiments.

FIGS. 6A-6C are charts showing exemplary relative encoding times for hybrid three pass encoding for video streaming as compared to the prior art method for three pass encoding, in accordance with one or more embodiments. As a baseline representation for comparison, chart 600 in FIG. 6A shows exemplary relative encoding times for the prior art three pass encoding method shown in FIG. 2, wherein all encodings of each of renditions 204-n are performed using the same encoder 202. The encoding time and complexity for the first pass encoding of each rendition is approximately the same as the encoding time and complexity for the second and/or third passes (e.g., together if performed in parallel, individually if performed in serial). In contrast, chart 610 in FIG. 6B shows exemplary relative encoding times for the present hybrid three pass encoding method shown in FIG. 3, wherein the first pass encoding is performed by a lower complexity encoder 302 on each of renditions 304-n, while the second and third pass encodings are performed by a higher complexity encoder 310. As shown, the encoding time for the first pass encoding of each of renditions 304-n is reduced significantly (e.g., up to 40%, 50%, or more) as compared to the prior art method encoding times shown in FIG. 6A as well as the encoding times for the second and/or third pass encodings of renditions 304-n. Chart 612 in FIG. 6C shows exemplary relative encoding times for the present hybrid three pass encoding method shown in FIG. 4, wherein a first pass encoding is performed by a lower complexity encoder 402 on a selected rendition (e.g., rendition 406 as shown, but in other examples, can be another rendition or more than one rendition, but fewer than all renditions, as described herein). As shown, the encoding time and number of encodings for the first pass encoding is significantly reduced as compared to the prior art method encoding times shown in FIG. 6A as well as the encoding times for the second and/or third pass encodings of renditions 404-*n*. The use of a lower complexity encoders 302 and 402 also results in significant reduction in complexity, and amount of computation as well, for the first pass encodings and the overall encoding of a given video input.

FIGS. 7A-7B are flow diagrams illustrating exemplary methods for hybrid three pass encoding for video streaming, in accordance with one or more embodiments. In FIG. 7A, method 700 begins with performing a first pass encoding of a video input using a lower complexity encoder (e.g., encoders 302, 402, and 502, as shown in FIGS. 3-5, respectively) in step 702, thereby generating a complexity curve for the video input. As described herein, the first pass may comprise a CRF encoding of the overall video input to generate the complexity curve for the video input—an overarching complexity curve (i.e., shape). The video input may then be split into a plurality of segments in step 704. Two pass encoding may be performed on each of the plurality of segments using a higher complexity encoder and the complexity curve generated in the first pass encoding at step 706. An encoded rendition of the video input may be output by the higher complexity encoder at step 708.

In FIG. 7B, method 750 may begin with performing a first pass encoding of a rendition of a video input using a lower complexity encoder, thereby generating a complexity curve for the rendition of the video input in step 752. In some examples, the rendition may comprise one of a plurality of renditions. Each of the plurality of renditions may be split into a plurality of segments at step 754. Two pass encoding may be performed at step 756 on each of the plurality of segments for the plurality of renditions using a higher complexity encoder and the complexity curve for the rendition. A plurality of encoded renditions (e.g., an encoded rendition corresponding to each of the plurality of renditions) of the video input may be output at step 758.

Example Computing Systems

Figure 8A:
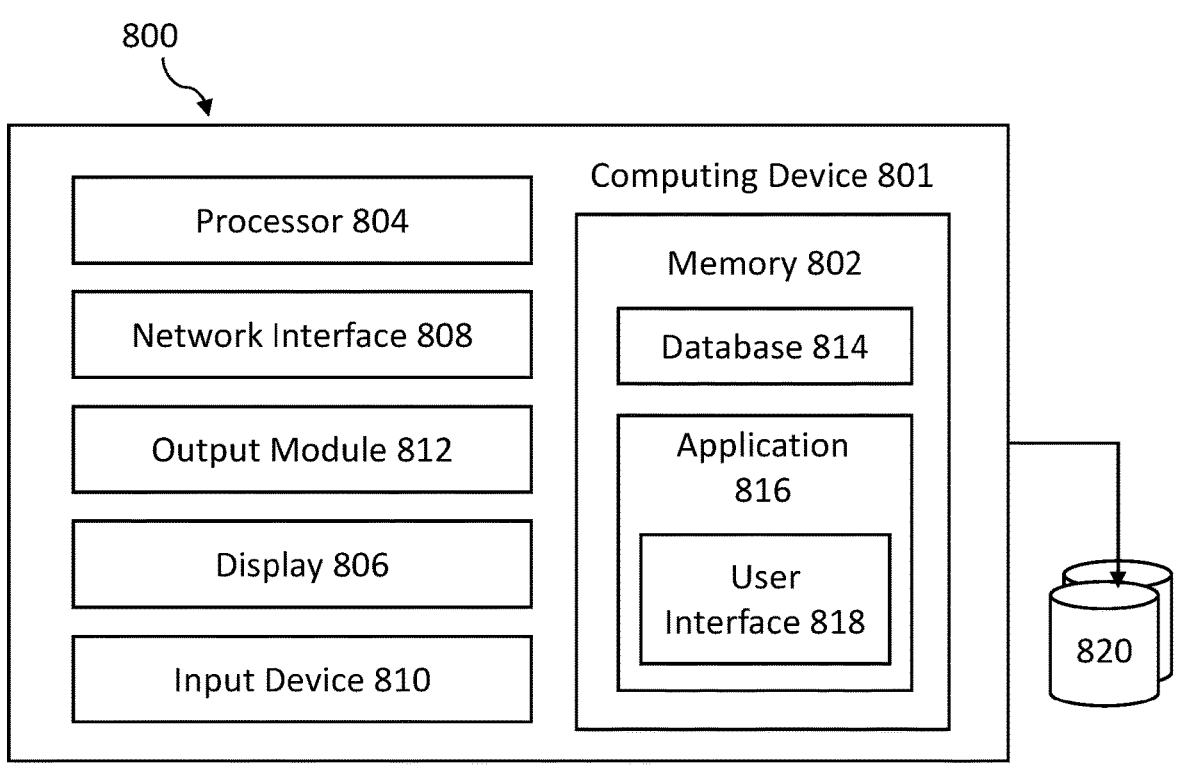
FIG. 8A is a simplified block diagram of an exemplary
computing system configured to implement the encoding
system shown in FIG. 1 and perform steps of the methods
illustrated in FIGS. 3-5 and 7A-7B, in accordance with one
or more embodiments.

FIG. 8A is a simplified block diagram of an exemplary computing system configured to implement the encoding system shown in FIG. 1 and perform steps of the methods illustrated in FIGS. 3-5 and 7, in accordance with one or more embodiments. In one embodiment, computing system 800 may include computing device 801 and storage system 820. Storage system 820 may comprise a plurality of repositories and/or other forms of data storage, and it also may be in communication with computing device 801. In another embodiment, storage system 820, which may comprise a plurality of repositories, may be housed in one or more of computing device 801. In some examples, storage system 820 may store networks, video data (e.g., video input, segments, rendition characteristics, encoded segments/renditions), bitrate ladders, complexity curves/shapes, codecs, metadata, instructions, programs, and other various types of information as described herein. This information may be retrieved or otherwise accessed by one or more computing devices, such as computing device 801, in order to perform some or all of the features described herein. Storage system 820 may comprise any type of computer storage, such as a hard drive, memory card, ROM, RAM, DVD, CD-ROM, write-capable, and read-only memories. In addition, storage system 820 may include a distributed storage system where data is stored on a plurality of different storage devices, which may be physically located at the same or different geographic locations (e.g., in a distributed computing system such as system 850 in FIG. 6B). Storage system 820 may be networked to computing device 801 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 801, which in some examples may be included in a mobile device and in other examples may be included in a server (e.g., server 101, and other servers described herein), also may include a memory 802. Memory 802 may comprise a storage system configured to store a database 814 and an application 816. Application 816 may include instructions which, when executed by a processor 804, cause computing device 801 to perform various steps and/or functions (e.g., performing encodings of video inputs and/or video segments, splitting video input into segments), as described herein. Application 816 further includes instructions for generating a user interface 818 (e.g., graphical user interface (GUI)). Database 814 may store various algorithms and/or data, including neural networks (e.g., convolutional neural networks) and data regarding resolutions, bitrates, videos/video renditions, complexity curves, device characteristics, network performance, among other types of data. Memory 802 may include any non-transitory computer-readable storage medium for storing data and/or software that is executable by processor 804, and/or any other medium which may be used to store information that may be accessed by processor 804 to control the operation of computing device 801.

Computing device 801 may further include a display 806, a network interface 808, an input device 810, and/or an output module 812. Display 606 may be any display device by means of which computing device 801 may output and/or display data. Network interface 808 may be configured to connect to a network using any of the wired and wireless short range communication protocols described above, as well as a cellular data network, a satellite network, free space optical network and/or the Internet. Input device 810 may be a mouse, keyboard, touch screen, voice interface, and/or any or other hand-held controller or device or interface by means of which a user may interact with computing device 801. Output module 812 may be a bus, port, and/or other interfaces by means of which computing device 801 may connect to and/or output data to other devices and/or peripherals.

In one embodiment, computing device 801 may be a data center or other control facility (e.g., configured to run a distributed computing system as described herein), and may communicate with a server and/or media playback device. As described herein, system 800, and particularly computing device 801, may be used for video playback, running an application, implementing a neural network, communicating with a server and/or a client, and otherwise implementing steps in a implementing an a hybrid three pass encoding for video streaming, as described herein. Various configurations of system 800 are envisioned, and various steps and/or functions of the processes described below may be shared among the various devices of system 800 or may be assigned to specific devices.

Figure 8B:
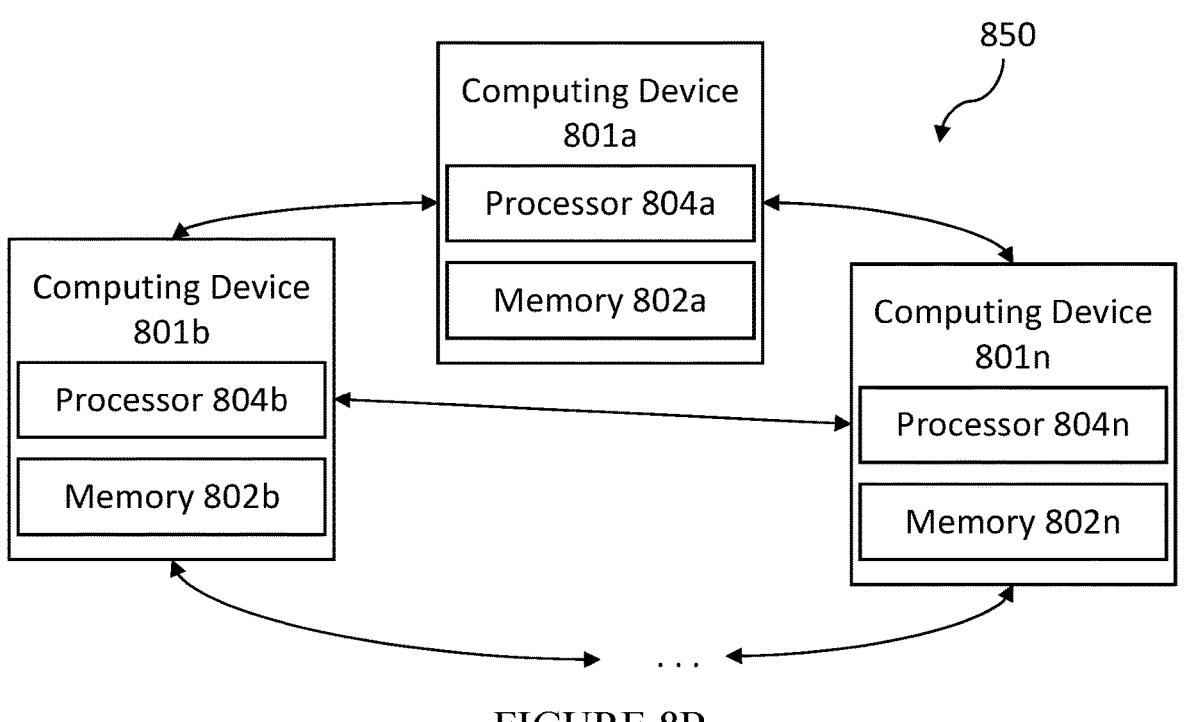
FIG. 8B is a simplified block diagram of an exemplary
distributed computing system implemented by a plurality of
the computing devices, in accordance with one or more
embodiments.

FIG. 8B is a simplified block diagram of an exemplary distributed computing system implemented by a plurality of the computing devices, in accordance with one or more embodiments. System 850 may comprise two or more computing devices 801*a-n*. In some examples, each of 801*a-n* may comprise one or more of processors 804*a-n*, respectively, and one or more of memory 802*a-n*, respectively. Processors 804*a-n* may function similarly to processor 804 in FIG. 8A, as described above. Memory 802*a-n* may function similarly to memory 802 in FIG. 8A, as described above.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

The above and other needs are met by the disclosed methods, a non-transitory computer-readable storage medium storing executable code, and systems for hybrid three pass encoding for video streaming. Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for hybrid three pass encoding, comprising:
performing a first pass encoding of a rendition of a video input using a lower complexity encoder, thereby generating a complexity curve for the video input;
splitting the rendition of the video input into a plurality of segments;
performing a two pass encoding of each of the plurality of segments using a higher complexity encoder and the complexity curve generated in the first pass encoding; and
outputting an encoded rendition of the video input,
wherein a first encoding time for performing the first pass encoding is at least 25% less than a second encoding time for performing the two pass encoding.

2. The method of claim 1, wherein the complexity curve from the first pass encoding characterizes an overarching shape of a complexity of the video input as a whole.

3. The method of claim 1, wherein the first pass encoding of the video input comprises an H.264 encoding.

4. The method of claim 1, wherein the two pass encoding of each of the plurality of segments comprises an AV1 encoding.

5. The method of claim 1, wherein the first pass encoding comprises a constant rate factor encoding.

6. The method of claim 1, further comprising performing the first pass encoding on another rendition of the video input, thereby generating another complexity curve.

7. The method of claim 6, further comprising combining the complexity curve with the other complexity curve using a mapping function configured to output a combined complexity curve, wherein the two pass encoding is performed using the combined complexity curve.

8. The method of claim 1, wherein the first encoding time for performing the first pass encoding is at least 40% less than the second encoding time for performing the two pass encoding.

9. The method of claim 1, wherein the first encoding time for performing the first pass encoding is at least 50% less than the second encoding time for performing the two pass encoding.

10. A system for hybrid three pass encoding, comprising:
a memory comprising non-transitory computer-readable storage medium configured to store video data;
one or more processors configured to execute instructions stored on the non-transitory computer-readable storage medium to:
perform a first pass encoding of a video input using a lower complexity encoder, thereby generating a complexity curve for the video input;
split the video input into a plurality of segments;
perform a two pass encoding of each of the plurality of segments using a higher complexity encoder and the complexity curve generated in the first pass encoding; and
output an encoded rendition of the video input,
wherein a first encoding time for performing the first pass encoding is at least 25% less than a second encoding time for performing the two pass encoding.

11. The system of claim 10, wherein the lower complexity encoder comprises an H.264 encoder.

12. The method of claim 10, wherein the higher complexity encoder comprises an AV1 encoder.

13. A method for hybrid three pass encoding, comprising:
performing a first pass encoding of a rendition of a video input using a lower complexity encoder, thereby generating a complexity curve for the rendition of the video input, the rendition comprising one of a plurality of renditions;
splitting each of the plurality of renditions into a plurality of segments;
performing two pass encoding on each of the plurality of segments for the plurality of renditions using a higher complexity encoder and the complexity curve for the rendition; and
outputting a plurality of encoded renditions of the video input,
wherein a first encoding time for performing the first pass encoding is at least 25% less than a second encoding time for performing the two pass encoding.

14. The method of claim 13, wherein the complexity curve from the first pass encoding characterizes an overarching shape of a complexity of the video input as a whole.

15. The method of claim 13, wherein the first pass encoding of the video input comprises an H.264 encoding.

16. The method of claim 13, wherein the two pass encoding of each of the plurality of segments comprises an AV1 encoding.

17. The method of claim 13, wherein the first pass encoding comprises a constant rate factor encoding.

18. The method of claim 13, wherein the first encoding time for performing the first pass encoding is at least 40% less than the second encoding time for performing the two pass encoding.

19. A system for hybrid three pass encoding, comprising:

a memory comprising non-transitory computer-readable storage medium configured to store video data;

one or more processors configured to execute instructions stored on the non-transitory computer-readable storage medium to:

perform a first pass encoding of a rendition of a video input using a lower complexity encoder, thereby generating a complexity curve for the rendition of the video input, the rendition comprising one of a plurality of renditions;

split each of the plurality of renditions into a plurality of segments;

perform two pass encoding on each of the plurality of segments for the plurality of renditions using a higher complexity encoder and the complexity curve for the rendition; and output a plurality of encoded renditions of the video input, wherein a first encoding time for performing the first pass encoding is at least 25% less than a second encoding time for performing the two pass encoding.

\* \* \* \* \*